United States Patent
Geller

(10) Patent No.: US 9,107,394 B2
(45) Date of Patent: Aug. 18, 2015

(54) DUAL DOG LEASH

(71) Applicant: Tamar Geller, Los Angeles, CA (US)

(72) Inventor: Tamar Geller, Los Angeles, CA (US)

( * ) Notice: Subject to any disclaimer, the term of this patent is extended or adjusted under 35 U.S.C. 154(b) by 277 days.

(21) Appl. No.: 13/907,420

(22) Filed: May 31, 2013

(65) Prior Publication Data

US 2014/0174377 A1 Jun. 26, 2014

Related U.S. Application Data

(60) Provisional application No. 61/653,742, filed on May 31, 2012.

(51) Int. Cl.
*B65H 75/34* (2006.01)
*A01K 27/00* (2006.01)

(52) U.S. Cl.
CPC .................. *A01K 27/004* (2013.01)

(58) Field of Classification Search
CPC .................................................. A01K 27/004
USPC ......... 119/796, 769, 797, 795, 798, 792, 793, 119/794, 787, 789, 790; D30/151, 153
See application file for complete search history.

(56) References Cited

U.S. PATENT DOCUMENTS

| 6,474,270 | B1 | 11/2002 | Imes |
| 6,648,261 | B2 | 11/2003 | Irving |
| 7,207,296 | B2 | 4/2007 | DiDinato |
| 7,455,034 | B2 * | 11/2008 | DiDonato .................. 119/796 |
| 7,980,202 | B2 * | 7/2011 | Bentz et al. ................ 119/796 |
| 8,151,735 | B1 | 4/2012 | McCrocklin |
| 8,683,960 | B2 * | 4/2014 | O'Brien et al. ............ 119/796 |
| 2011/0067649 | A1 * | 3/2011 | O'Brien et al. ............ 119/796 |
| 2013/0276718 | A1 * | 10/2013 | Valadez et al. ............ 119/796 |

* cited by examiner

*Primary Examiner* — Andrea Valenti

(74) *Attorney, Agent, or Firm* — Lewis Kohn & Walker LLP; David Kohn; Kari Moyer-Henry

(57) ABSTRACT

The present invention to provides a dual leash for walking two dogs with a single compact leash while preventing entangling of the individual cables. Horizontal positioning of the spools achieves a more compact design as well as a new way to combine the rotation of the housing with a lock feature. The key to a compact design is to maximize the spool size for proper spring steel retraction functionality and maximization on cord length. Preferably, the companion animal is a canine. Another object of the present invention is to provide individual cable retraction with a non-entangle feature.

19 Claims, 8 Drawing Sheets

8a

8b

DUAL DOG LEASH

CROSS REFERENCES TO RELATED APPLICATIONS

This application is a non-provisional patent application, which claims the benefit of priority from U.S. Provisional Application No. 61/653,742, filed May 31, 2012, the entire contents of which are incorporated herein by reference.

FIELD OF THE INVENTION

The present invention is a multi-cabled retractable pet leash with an independently rotating enclosure to prevent entanglement of the separate cables.

BACKGROUND OF THE INVENTION

Retractable leashes for pets, particularly dogs, are present in the prior art. A variety of leashes have been described ranging from single cord and/or leather leashes to more versatile leashes having telescoping features. Retractable leashes have become more popular in recent years because they allow the pet owner to have a lead cable of varying lengths, which translates to varying levels of control over the animal, depending on the environment and/or situation encountered by the pet owner while walking a pet. For example, in largely open areas, the pet owner can allow the animal to roam more freely by extending the lead cable further while still maintaining a level of control over the animals such that the animal is not free to run away from the pet owner. Similarly, in crowded areas or areas which may pose a hazard to the pet, the owner can restrict the extension of the lead cable and keep the animal closer and under greater control compared to when the lead cable is fully extended.

Pet owners who have more than one pet, in particular dogs, may wish to exercise their dogs at the same time. However, an individual may find it difficult to control two separate dogs on two separate leashes. When attempting to walk multiple dogs, a pet owner will often find that one dog walks slower than the other, one dog wants to run and explore more than the other, and/or one dog will have to stop to relieve itself when the other wants to keep walking. In order to accommodate each dog, a multi-cabled leash is necessary. Multi-cabled leashes are also known in the art, however the majority of multi-cabled leashes are simple lengths of cord and/or leather which allow a pet owner to walk two pets simultaneously without any control over the length of the lead and/or control over the animals.

U.S. Pat. No. 6,474,270 to Imes discloses a dog leash for use with two or more dogs that enables two dogs to be walked simultaneously comprised of an automatically retractable leash commercially known as Flexi-2® and a second leash having a nylon strap in which one end of the strap is connected to a dog collar and the other end of the strap contains a pulley that runs over the narrow cord of the first retractable leash.

U.S. Pat. No. 6,648,261 to Irving discloses an extendible and retractable lead that can be extended or retracted in position in a single action.

U.S. Pat. No. 6,792,893 to Quintero et al. discloses a retractable leash for two animals which includes two spool assemblies for individual extension and retraction of each animal's cord with each animal's cord controlled by its own button and locking mechanism.

U.S. Pat. No. 7,207,296 to DiDonato discloses a two-pet no-tangle retractable leash device including an axel having a rod opening perpendicular to its axis and a first spool including a first leash and a second spool including a second leash rotatably mounted on the axel.

U.S. Pat. No. 8,151,735 to McCrocklin discloses a leash for coupling a first animal and a second animal to an object wherein the object comprises an exterior bulbous body and an interior bulbous body and a first tether spool and a second tether spool housed within the interior bulbous body and the rotation of the interior bulbous body occurs upon a traversing of the first tether relative to the second tether and prevents the first tether from entangling with the second tether.

In light of the above, it is an object of the present invention to provide the desired features described herein as well as additional advantages such as providing the ability of walking two dogs with a single compact leash while preventing entangling of the individual cables. The horizontal positioning of the spools achieves a more compact design as well as a new way to combine the rotation of the housing with a lock feature. The key to a compact design is to maximize the spool size for proper spring steel retraction functionality and maximization on cord length. Preferably, the companion animal is a canine. Another object of the present invention is to provide individual cable retraction with a non-entangle feature.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

Figure 1:
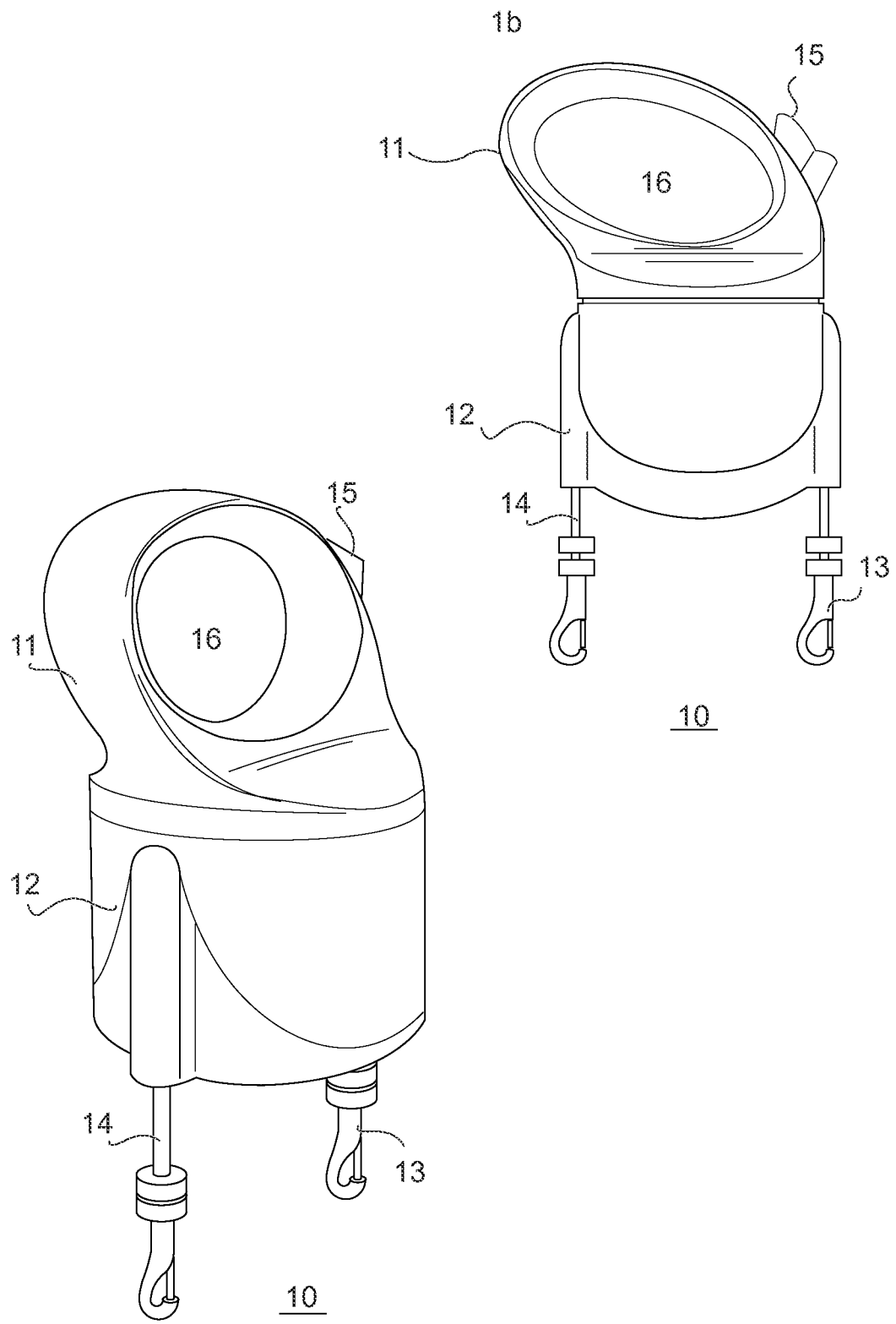
FIG. 1 illustrates two side perspective views of the dual animal leash as 1a and 1b.

A dual leash 10 is illustrated in side perspective views in FIGS. 1a and 1b. The dual leash 10 has a handle portion 11 with an opening for a user's hand 16 and a main body portion 12. Extending from the body portion 12 are two clips 13 for securing to an animal collar wherein each clip 13 is attached to a retractable lead cable 14. The retractable lead cables 14 may be locked from retracting by compression of the push button lock 15.

Figure 2:
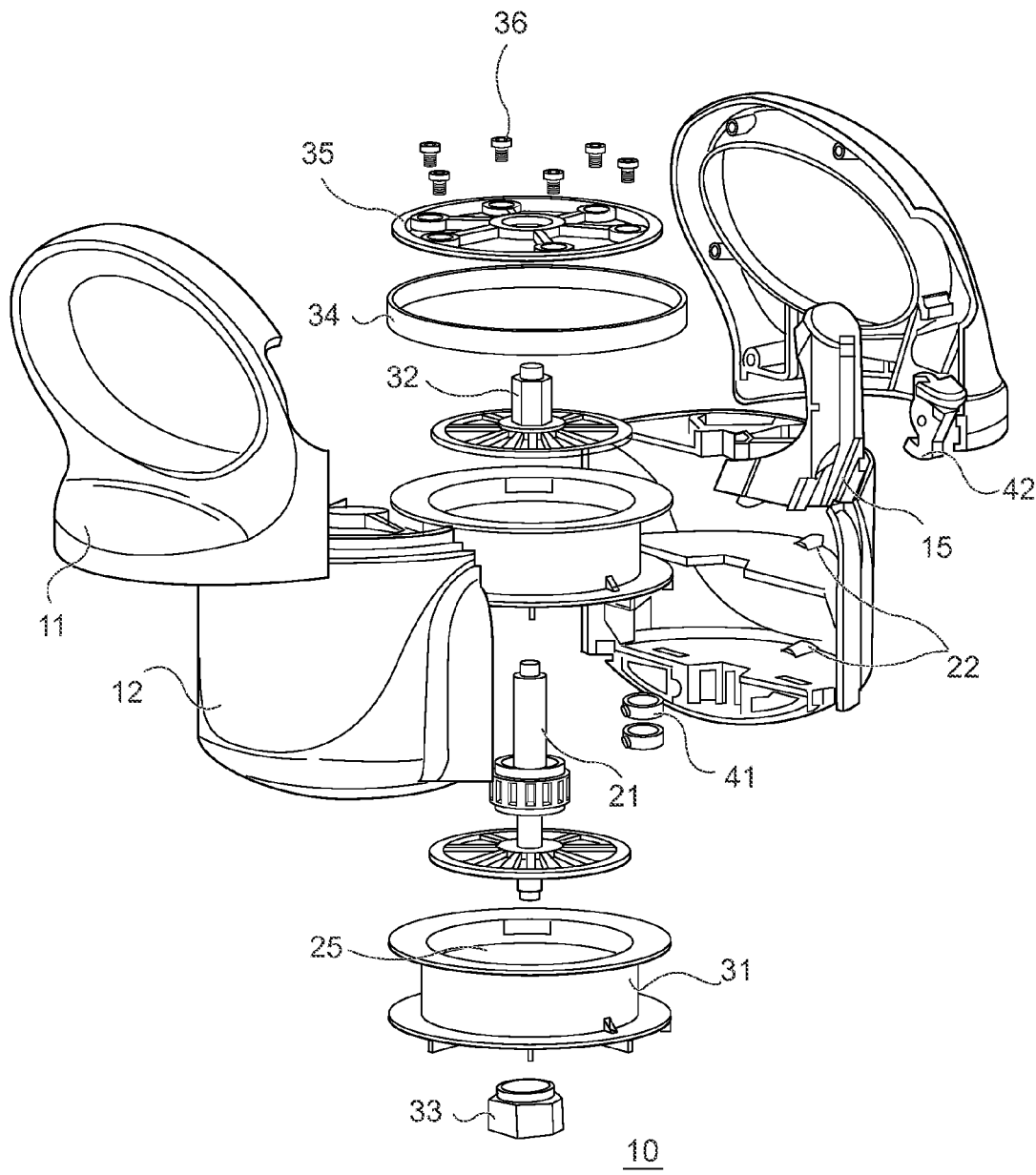
FIG. 2 illustrates a first exploded perspective view of the dual animal leash.

A dual leash 10 is illustrated in a first exploded perspective view in FIG. 2. The main body 12 is hollow with a support spindle 21 inserted centrally within. The support spindle 21 extends across the hollow opening of the main body 12 and is mounted at the top of the main body 12 with a spindle top cap 32 and at the bottom of the main body 12 with a spindle bottom cap 33. A compression spring (not shown) is inserted over the support spindle 21 external to the spindle bottom cap 33 and biases the hollow opening of the main body 12 towards a push button lock 15 in the handle portion 11. Compression of the push button lock 15 causes the hollow opening of the main body 12 to move relative to the support spindle 21 by sliding along the longitudinal axis of the support spindle 21 and as a result compressing the compression spring (not shown) and engaging the spool stop features 22 on the main body 12. Engagement of the down position lock 42 may be utilized for hands-free locking of the cord spools 31. When the push button lock 15 is released, the compression spring forces the hollow opening of the main body 12 to move back towards the mounting point of the push button lock 15 in the handle portion 11 thereby releasing the spool stop features 22. Two cord spools 31 are mounted on the support spindle 21 within the hollow opening of the main body 12. The cord spools 31 rotate about a vertical rotation axis as a function of spring steel contained within the central chamber 25 of each cord spool 31. The cord spools 31 are secured within the main body 12 on the top by a spindle top cap 32 and on the bottom by a spindle bottom cap 33. A body top plate 35 secured by screws 36 holds a precision thin section ball bearing 34 in position above the top cord spool 31. The ball bearing 34 enables the main body 12 to rotate freely in relation to the handle portion 11 with minimal friction thereby ensuring the non-entangling of the separate retractable lead cables 14. Eyelets 41 provide guidance for the smooth extension and retraction of the cord within the main body 12.

Figure 3:
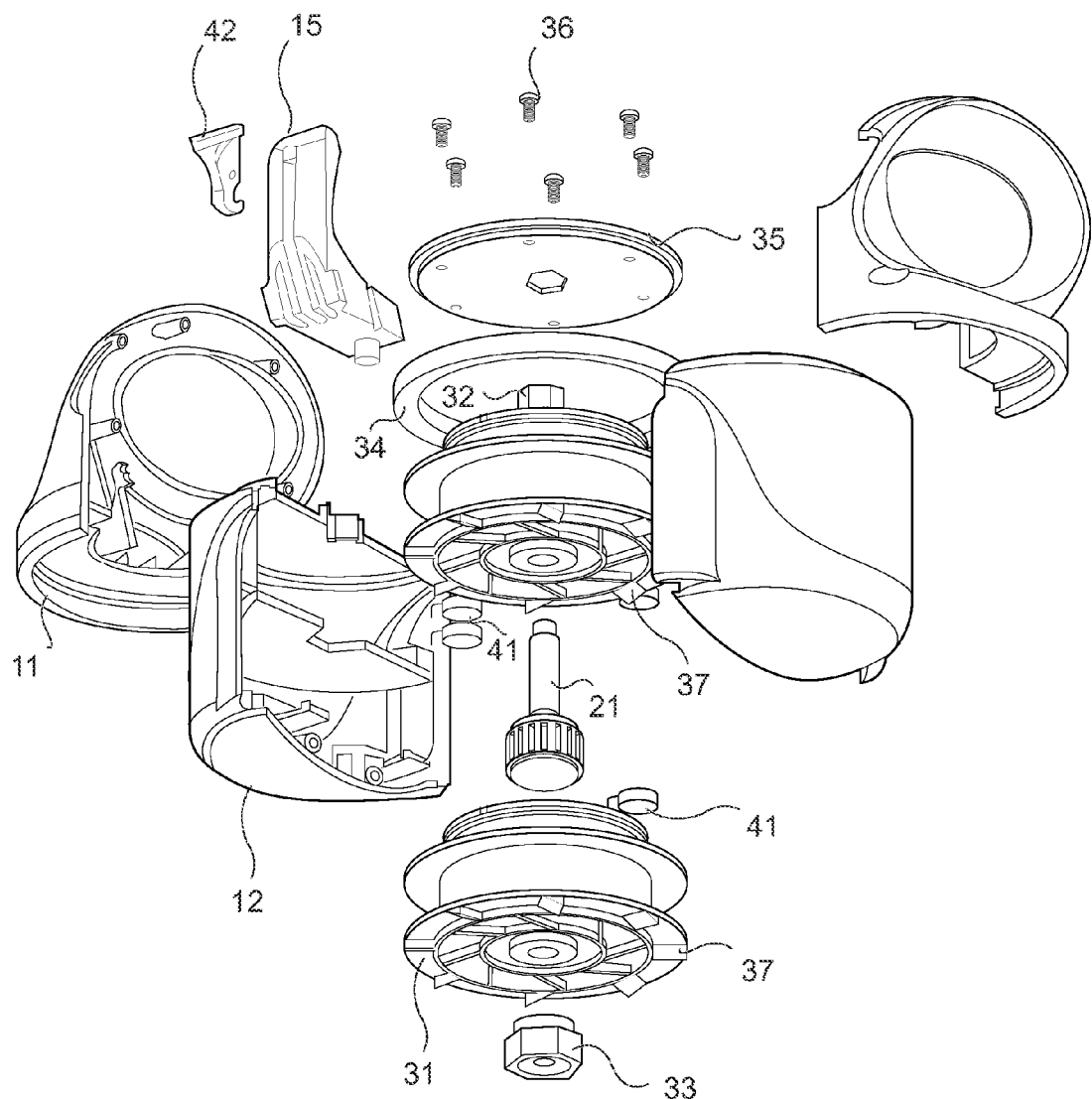
FIG. 3 illustrates a second exploded perspective view of the dual animal leash.

A dual leash 10 is illustrated in a second exploded perspective view in FIG. 3. The push button lock 15 is shown mounted over the support spindle 21 and provides a lever-like action to push the hollow opening of the main body 12 relative to the support spindle 21. The cord spools 31 are secured within the main body 12 on the top by a spindle top cap 32 and on the bottom by a spindle bottom cap 33. A body top plate 35 secured by screws 36 holds a precision thin section ball bearing 34 in position above the top cord spool 31. The cord spools 31 within the main body 12 and the main body 12 rotate relative to the handle portion 11 about a vertical rotation axis. The push button lock 15 shares the same rotation axis as the cord spools 31 and main body 12, providing that the push button lock 15 can be depressed no matter the rotational position of the main body 12 to the handle portion 11. The locking of the cord spools 31 is triggered by a series of teeth 37 that extend from the circular flat surface of the cord spools 31. The teeth 37 are arranged in a radial pattern. Spool stop features 22 (see FIG. 2), not visible in FIG. 3, are provided within the hollow opening of the main body 12, extending from the inner wall of the main body 12. At least one spool stop feature 22 is configured to engage the teeth 37. When the push button lock 15 is compressed, the hollow opening of the main body 12 is shifted such that the cord spools 31 are moved toward the spool stop features 22 inside the main body 12 and the teeth 37 on each cord spool 31 engage the spool stop features 22 to prevent the rotation of the cord spools 31. Eyelets 41 provide guidance for the smooth extension and retraction of the cord within the main body 12. Engagement of the down position lock 42 may be utilized for hands-free locking of the cord spools 31.

Figure 4:
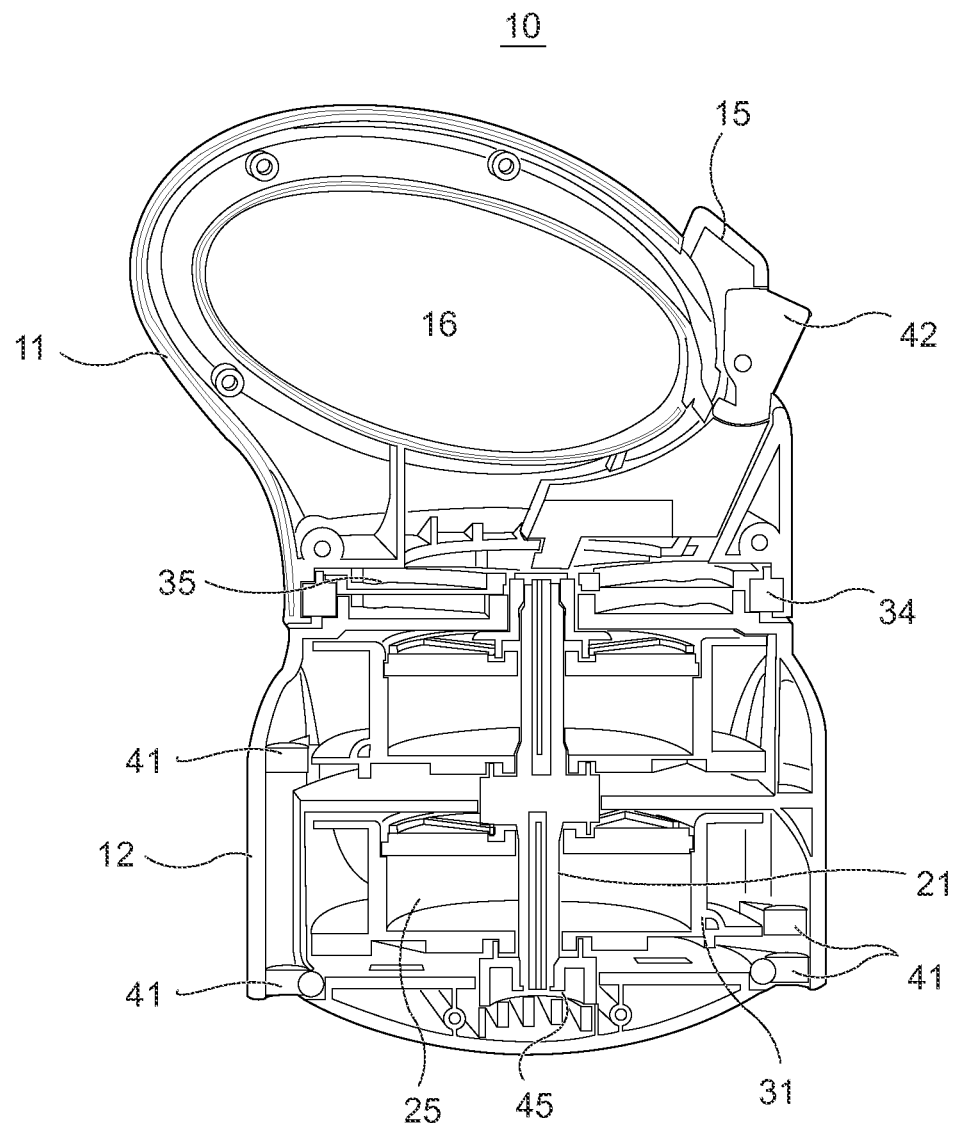
FIG. 4 illustrates a cross-section perspective view of the dual animal leash with the locking mechanism in the "up" position.

A dual leash 10 is illustrated in a cross-section perspective view in FIG. 4. The handle portion 11 with an opening for a user's hand 16 is adjacent to the push button lock 15, shown in the "up" position such that the cord spools 31 and the retractable lead cables 14 (not shown) can retract in and out of the main body 12. Eyelets 41 provide guidance for the retractable lead cables 14. A down position lock 42 allows the user to stop the rotation of the cord spools 31 by securing the push button lock 15 in a compressed position without the need to continually compress the push button lock 15. When the push button lock 15 is compressed, the spindle 21 is forced downward causing tension in the compression spring 45 at the base of the main body 12. The precision thin section ball bearing 34, secured in place by the body top plate 35, allows for the free movement of the handle portion 11 in relation to the main body 12 about the vertical axis. Spring steel positioned within the central chamber 25 of the cord spools 31 provides the automatic retraction of the lead cables 14 once the tension on the spring steel is released.

Figure 5:
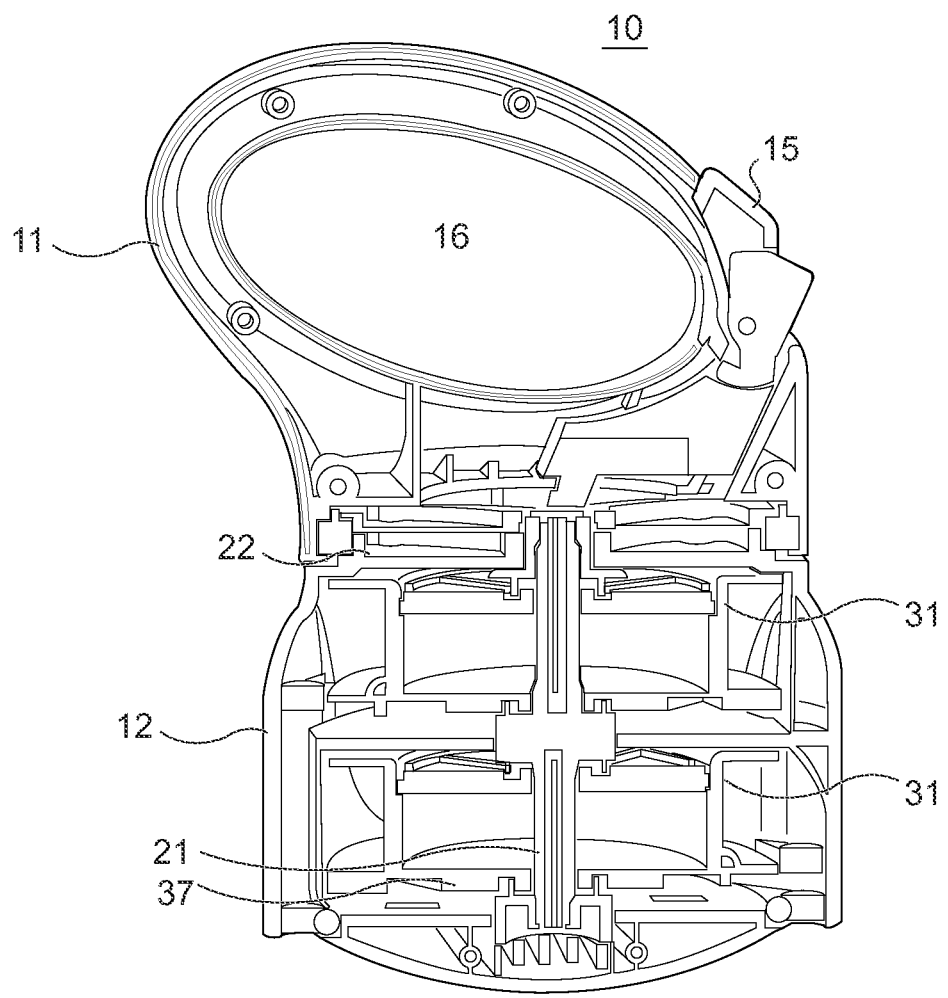
FIG. 5 illustrates a cross-section perspective view of the dual animal leash with the locking mechanism in the "down" position

A dual leash 10 is illustrated in a cross-section perspective view in FIG. 5. The compression of the push button lock 15 results in the vertical downward movement of the support spindle 21/cord spool 31 assembly as shown by the large downward arrow, which allows for the engagement of the teeth 37 with the spool stop features 22 to prevent the rotation of the cord spools 31.

Figure 6:
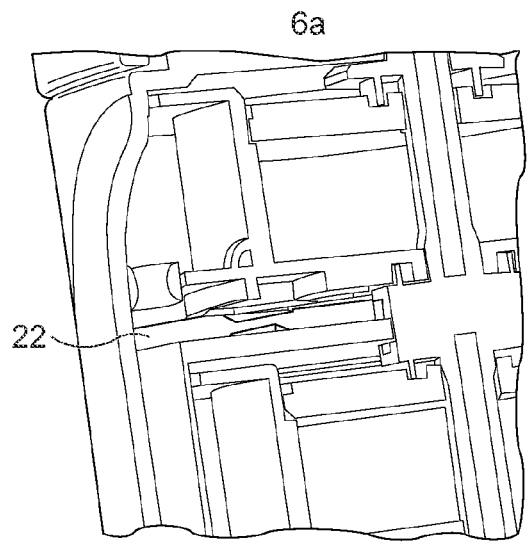
FIG. 6 illustrates several close-up cross-section perspective views of the handle of the dual animal leash with the locking mechanism in the "down" position as 6a, 6b and 6c.
Figure 6:
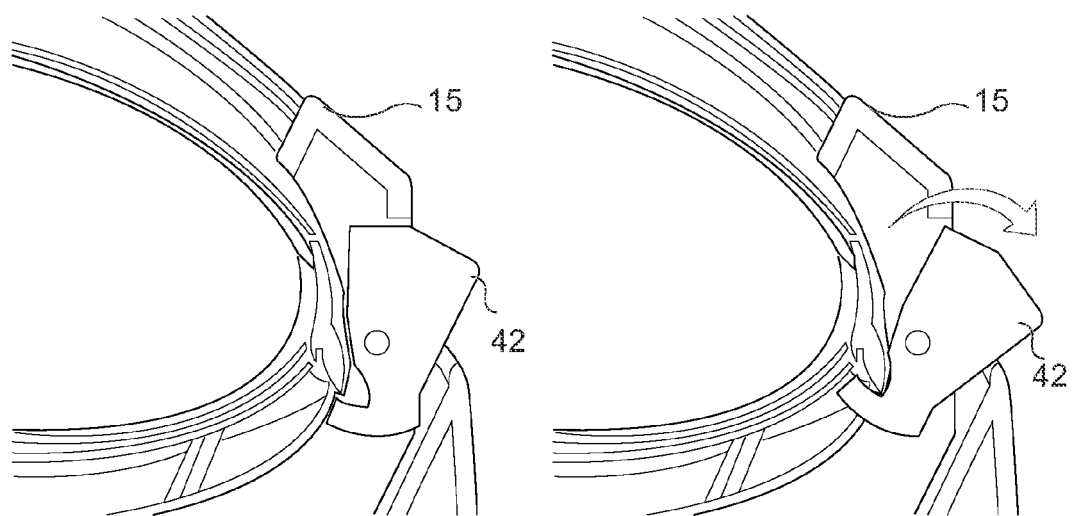

A handle portion 11 of a dual leash 10 is illustrated in a close-up cross-section perspective view in FIG. 6. The spool stop features 22 on the main body 12 are shown in FIG. 6a. When the push button lock 15 is in the "down" position, as shown in FIG. 6b, the down position lock 42 can be pushed forward to engage a hook to secure the push button lock 15 in the "down" position without having to hold down the locking mechanism 15, as shown in FIG. 6c. The down position lock 42 can be disengaged by a downward motion and a compression spring will force the support spindle/cord spool assembly upwards further allowing the cord spools to rotate and the cables to retract or extend (not shown).

Figure 7:
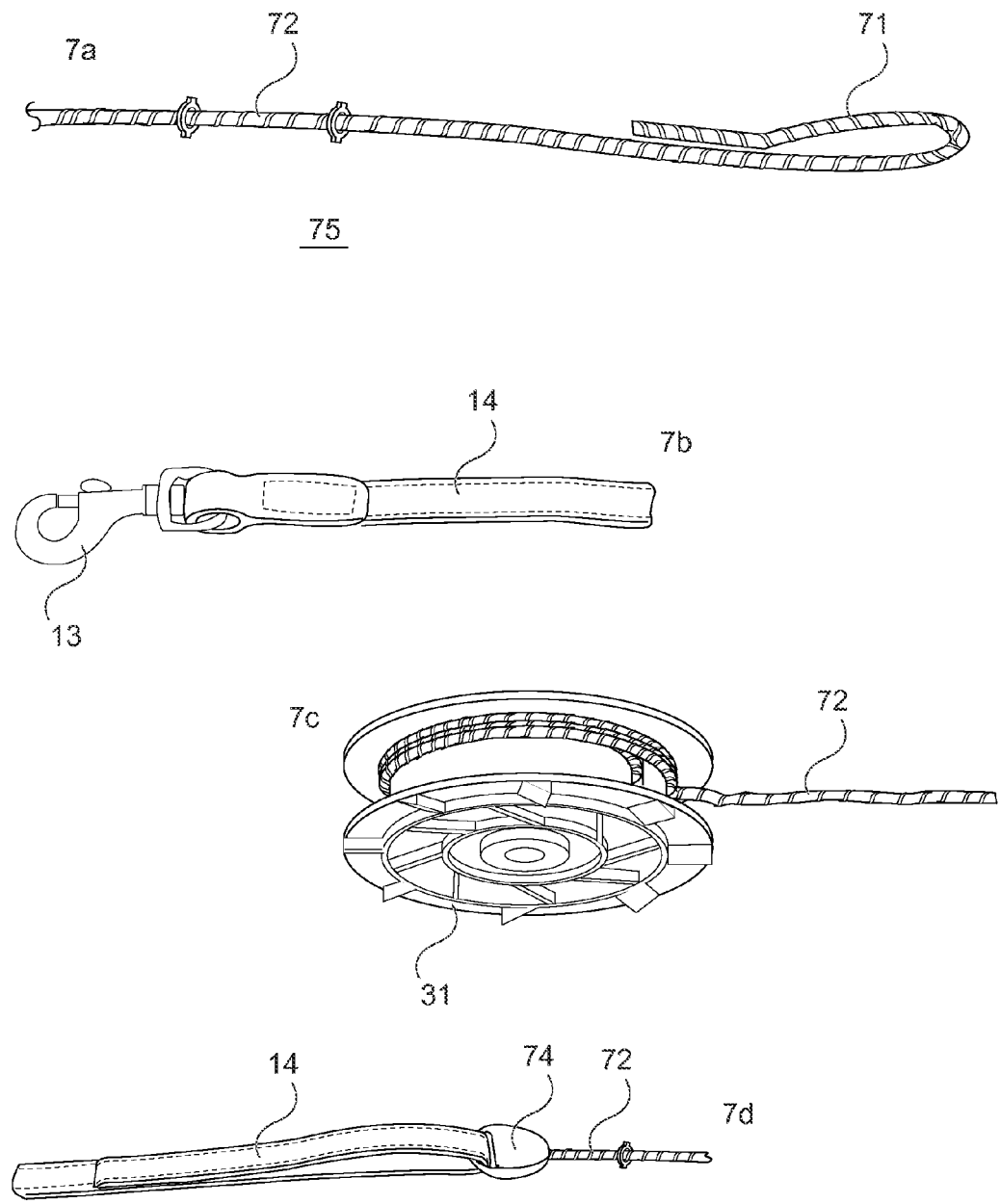
FIG. 7 illustrates several detailed perspective views of the dual animal leash cord as 7a, 7b, 7c and 7d.

Details of a single retractable lead cable 14 and attached cord 75 are shown in FIG. 7. The internal end 71 connected to the spooling portion 72 of cord 75 is shown in FIG. 7a. The internal end 71 is a loop that is secured about the cord spool 31 (not shown). The external end of the retractable lead cable 14 which contains a clip 13 for attaching to an animal collar (not shown) is shown in FIG. 7b. The securing of the internal end 71 of the spooling portion 72 is shown attached to a cord spool 31 in FIG. 7c. A retraction blocking element 74, positioned on the spooling portion 72 of the cord 75 where the cord 75 connects to the external end of the retractable lead cable 14 is shown in FIG. 7d. The retraction blocking element 74 prevents the external end of the retractable lead cable 14 from retracting into the main body 12.

Figure 8:
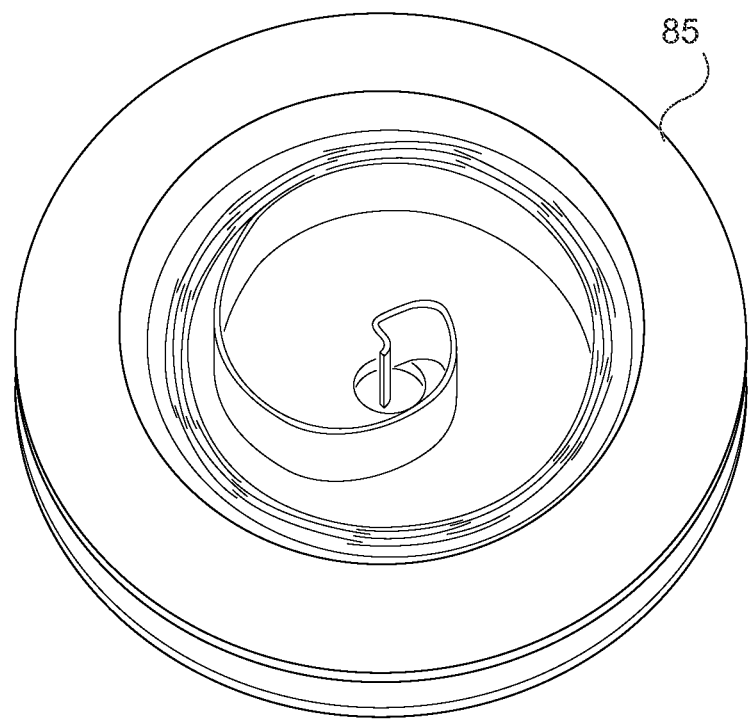
FIG. 8 illustrates two top perspective views of the spring steel retraction feature of the dual animal leash as 8a and 8b.
Figure 8:
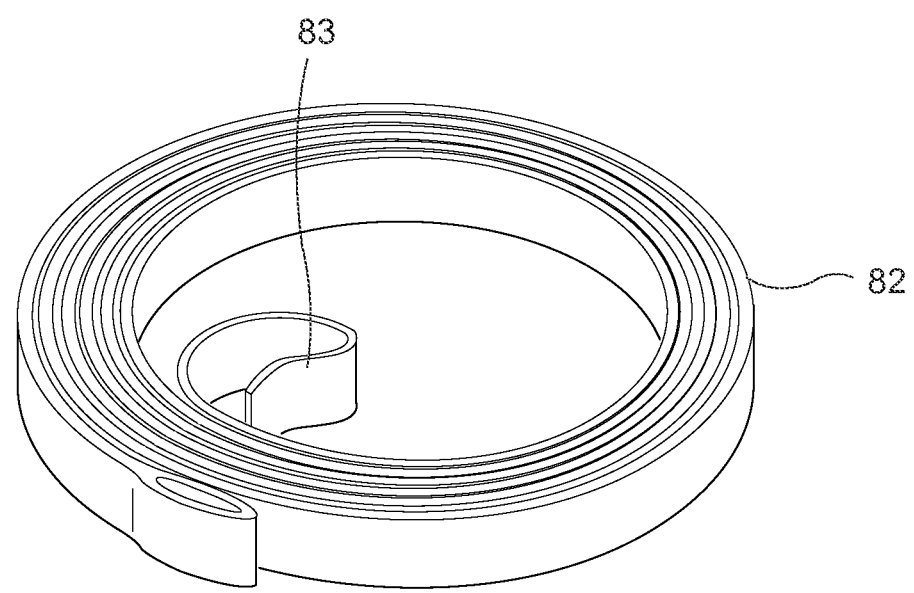

The spring steel 82 within each cord spool 31 (not shown) is shown in FIG. 8. A single spring steel 82 placed within a cord spool 85 is shown in FIG. 8a. A single spring steel 82 is shown in FIG. 8b. When in a native position, the spring steel 82 is coiled as shown in 8b devoid of tension resulting in the complete retraction of the spooling portion 72 if the cord 75. The center of the spring steel 83 is secured to the support spindle 21 (not shown) such that when the retractable lead cable 14 is extended, the cord spool 31 (not shown) rotates vertically about the support spindle 21 causing the spring steel to move into a tensioned state about the support spindle 21. When the tension in the spring steel 82 is released the retractable lead cable 14 and the spooling portion 72 of the cord 75 are automatically retracted into the main body 12 by means of the cord spool 31 rotating about the support spindle 21.

The present invention provides a multi-cabled retractable pet leash for walking two pets simultaneously using a single compact design.

One embodiment of the present invention provides a multi-cabled retractable pet leash, the leash comprising:
- a main body extending vertically, defined by a top portion and a bottom portion and defining the main chamber within said main body;
- a stationary support spindle located centrally within the main body and extending between the top portion and the bottom portion;
- a first cord spool positioned vertically in relation to a second cord spool within the main body such that each cord spool may rotatably engage with the support spindle about a vertical rotational axis;
- a first cord coiling about said first cord spool;
- a second cord coiling about said second cord spool;
- a spindle top cap positioned externally to said first cord spool;
- a spindle bottom cap positioned externally to said second cord spool;
- a precision thin section ball bearing located above said first cord spool;
- a body top plate positioned above the precision thin section ball bearing secured with screws;
- a handle positioned above the support spindle and exterior to the precision thin section ball bearing;
- a first lead cable and a second lead cable extending from the main body wherein the end of each lead cable comprises a clip; and
- a locking feature in said handle.

In another embodiment of the present invention, the multi-cabled retractable pet leash contains a main chamber within the main body which is further divided into an upper chamber positioned vertically in relation to a lower chamber within the main body. In a preferred embodiment, the lower floor of the first chamber further contains spool stop features which protrude vertically from said floor and the lower floor of the second chamber further contains spool stop features which protrude vertically from said floor.

In another embodiment of the present invention, the multi-cabled retractable pet leash is further comprised of a single cord spool located within each of said upper chamber and said lower chamber. In a preferred embodiment, a first cord is coiled about said first cord spool and a second cord is coiled about said second cord spool. In yet another embodiment, the lower surface of said first cord spool and said second cord spool contain teeth which engage the spool stop features in the upper and lower chamber when the locking mechanism is compressed.

In another embodiment of the present invention, the multi-cabled retractable pet leash is further comprised of a spring steel retractable feature located in the center of each of said first cord spool and said second cord spool. In a preferred embodiment, the spring steel is secured at one end to the support spindle. In yet another embodiment, the first cord spool and second cord spool extend and retract independent of each other.

In another embodiment of the present invention, the multi-cabled retractable pet leash has a retraction lock feature wherein the retraction of the cord may be locked without the user having to continue to compress the locking mechanism.

In another embodiment of the present invention, the multi-cabled retractable pet leash has a precision thin section ball bearing mounted at the juncture of the main body and the handle such that the ball bearing allows the main body and the handle to rotate independently with minimal friction thereby ensuring the non-entanglement of the separate lead cables.

In a preferred embodiment, when the push button lock is engaged, the central spindle is pressed in the downward position, causing the cord spools to interact with the spool stop features on the main body. The stop features will engage each spool independent of the position of the housing in relation to the handle and allow the housing to rotate freely about the ball bearing ring even when the locking mechanism is engaged. This feature is a key improvement over the prior art because the dual leashes described in the prior art become locked when the spools are locked. Pet owners will appreciate the continued free rotation of the housing while locking the rotation of the spools because dogs may continue to roam and move about in relation to each other and the leash housing even when the owner has the desire to control the length of leash released from the spool.

In addition to the rotation of the housing, even when spool rotation is locked, the simplified locking mechanism is an improvement over the prior art. The use of a central spindle for the positioning of the spools as well as the action point of the locking mechanism eliminates the requirement of the shaft mounted to the housing, which is a required element in the prior art. The direct action of the locking mechanism on the central spindle to press the spools into a locked position (i.e. engaging with the spool stop features) requires fewer components compared to the prior art. The requirement of fewer components translates to fewer points of malfunction in the locking mechanism as well as a lower cost in manufacturing because of fewer, less complex internal components.

It will be appreciated that details of the foregoing embodiments, given for purposes of illustration, are not to be construed as limiting the scope of this invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

The invention claimed is:

1. A multi-cabled retractable pet leash, the leash comprising:
- a main body extending vertically, defined by a top portion and a bottom portion and defining the main chamber within said main body;
- a stationary support spindle located centrally within the main body and extending between the top portion and the bottom portion;
- a first cord spool positioned vertically in relation to a second cord spool within the main body such that each cord spool may rotatably engage with the support spindle about a vertical rotational axis;
- a first cord coiling about said first cord spool;
- a second cord coiling about said second cord spool;
- a spindle top cap positioned externally to said first cord spool;
- a spindle bottom cap positioned externally to said second cord spool;
- a compression spring located externally to said spindle bottom cap;
- a precision thin section ball bearing located above said first cord spool;

a body top plate positioned above the precision thin section ball bearing secured with screws;

a handle positioned above the support spindle and exterior to the precision thin section ball bearing;

a first lead cable and a second lead cable extending from the main body wherein the end of said first lead cable and said second lead cable comprises a clip; and a locking feature in said handle.

2. The multi-cabled retractable pet leash of claim 1, wherein the main chamber within the main body is further divided into an upper chamber positioned vertically in relation to a lower chamber within the main body.

3. The multi-cabled retractable pet leash of claim 2, wherein an upper chamber and a lower chamber each house a single cord spool.

4. The multi-cabled retractable pet leash of claim 3, wherein the first cord spool and the second cord spool rotate about the support spindle independently in relation to each other.

5. The multi-cabled retractable pet leash of claim 3, wherein the upper chamber and the lower chamber are further comprised of spool stop features which protrude vertically from the lower floor of said first chamber and said second chamber.

6. The multi-cabled retractable pet leash of claim 1, wherein the first cord spool and the second cord spool each house a spring steel retraction feature within the center of said cord spool.

7. The multi-cabled retractable pet leash of claim 6, wherein one end of the spring steel is secured to the support spindle.

8. The multi-cabled retractable pet leash of claim 7, wherein extension of the lead cable results in the rotation of the cord spool about the support spindle thereby causing the spring steel to coil about said support spindle and create tension in the spring steel within said cord spool.

9. The multi-cabled retractable pet leash of claim 8, wherein the release of said tension in the spring steel results in the rotation of the cord spool in the opposite direction thereby recoiling the extended lead cable about the cord spool and retracting said lead cable.

10. The multi-cabled retractable pet leash of claim 6, wherein the first cord spool and second cord spool further contain teeth-like protrusions on the lower external surface of said first cord spool and said second cord spool.

11. The multi-cabled retractable pet leash of claim 1, wherein the precision thin section ball bearing provides for the independent rotation of the main body in relation to the handle thereby preventing the first lead cable and the second lead cable from becoming tangled as the first lead cable and the second lead cable extend and retract.

12. The multi-cabled retractable pet leash of claim 1, wherein the locking feature is further comprised of a locking mechanism which extends into the main body and a lock feature which may be compressed to secure the locking mechanism in the locked position.

13. The multi-cabled retractable pet leash of claim 12, wherein compression of the locking mechanism results in the coordinated downward movement of the support spindle, first cord spool and second cord spool in relation to the main body.

14. The multi-cabled retractable pet leash of claim 13, wherein the coordinated downward movement of the support spindle, first cord spool and second cord spool results in the engagement of a spool stop feature in an upper chamber and a lower chamber with teeth-like protrusions on the lower external surface of the first cord spool and the second cord spool thereby preventing further rotation of said first cord spool and said second cord spool.

15. The multi-cabled retractable pet leash of claim 14, wherein the engaging of the lock feature results in the engaging of a hook feature on the locking mechanism thereby allowing the rotation of the first cord spool and the second cord spool to remain locked in the absence of continued compression of the locking mechanism.

16. The multi-cabled retractable pet leash of claim 13, wherein the downward movement of the support spindle, first cord spool and second cord spool results in the compression of the compression spring.

17. The multi-cabled retractable pet leash of claim 13, wherein the release of the locking mechanism results in the release of tension from the compression spring thereby forcing the support spindle, first cord spool and second cord spool to move vertically upward into said native position relative to the main body.

18. The multi-cabled retractable pet leash of claim 1, wherein the extension of the first lead cable and the second lead cable is guided by a first pair of eyelets and a second pair of eyelets mounted within the main body.

19. The multi-cabled retractable pet leash of claim 1, wherein the first lead cable and the second lead cable are prevented from retracting completely into the main body by a first retraction blocking element and a second retraction blocking element.

* * * * *